(12) United States Patent
Willibald

(10) Patent No.: US 9,526,197 B2
(45) Date of Patent: Dec. 27, 2016

(54) FORCE-TRANSMITTING UNIT

(71) Applicant: Artur Willibald, Überlingen (DE)

(72) Inventor: Artur Willibald, Überlingen (DE)

(73) Assignee: Artur Willibald, Überlingen (DE)

( * ) Notice: Subject to any disclaimer, the term of this patent is extended or adjusted under 35 U.S.C. 154(b) by 169 days.

(21) Appl. No.: 14/355,242

(22) PCT Filed: Oct. 24, 2012

(86) PCT No.: PCT/EP2012/004434
§ 371 (c)(1),
(2) Date: Apr. 30, 2014

(87) PCT Pub. No.: WO2013/068077
PCT Pub. Date: May 16, 2013

(65) Prior Publication Data
US 2014/0342863 A1    Nov. 20, 2014

(30) Foreign Application Priority Data

Nov. 7, 2011  (DE) .................. 10 2011 117 770

(51) Int. Cl.
*A01B 33/14*   (2006.01)
*A01B 71/06*   (2006.01)
(Continued)

(52) U.S. Cl.
CPC ............ *A01B 33/142* (2013.01); *A01B 71/06* (2013.01); *B60K 17/04* (2013.01); *B62D 49/02* (2013.01); *F16H 7/02* (2013.01)

(58) Field of Classification Search
CPC ....... A01B 29/06; A01B 33/02; A01B 33/103; A01B 33/142; A01B 35/16; A01B 71/06; B62D 49/02; B60K 17/04; F16H 7/02
(Continued)

(56) References Cited

U.S. PATENT DOCUMENTS 1,526,624 A * 2/1925 Bockelman, Jr. ...... A01B 71/06
                                                   74/355
1,640,642 A * 8/1927 Brown .................. A01B 71/06
                                                   180/14.1

(Continued)

FOREIGN PATENT DOCUMENTS

DE      1 655 950 A1    9/1971
DE      84 16 128 U1    8/1984
(Continued)

OTHER PUBLICATIONS

German Search Report dated Jul. 5, 2012 issued in corresponding DE patent application 10 2011 117 770.5 (and partial English translation).

(Continued)

*Primary Examiner* — Minh Truong
(74) *Attorney, Agent, or Firm* — Posz Law Group, PLC

(57) ABSTRACT

The invention is based on a vehicle device having a drive unit, a gear unit which is at least substantially securely connected to the drive unit and which comprises an output shaft to drive an application tool which can be orientated relative to the gear unit, and a force-transmitting unit between the gear unit and the application tool. In order to provide a generic vehicle device having an advantageously long service-life, it is proposed that the force-transmitting unit have at least one first drive wheel which is connected to the output shaft in an at least substantially rotationally secure manner in at least one operating state and which has a rotation axis which is orientated at least substantially perpendicularly relative to a forward direction.

18 Claims, 4 Drawing Sheets

Figure 1A:
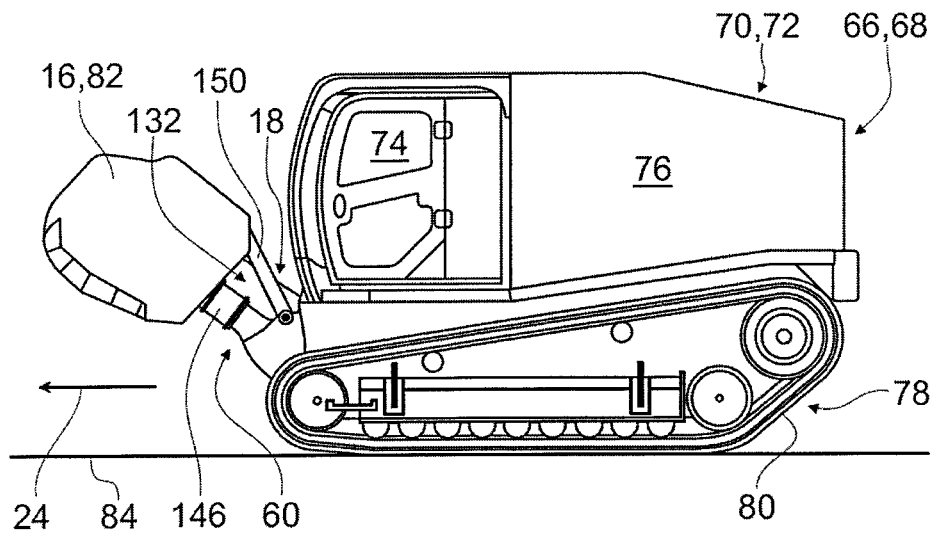

(51) Int. Cl.
*B62D 49/02* (2006.01)
*F16H 7/02* (2006.01)
*B60K 17/04* (2006.01)

(58) Field of Classification Search
USPC .................................................. 474/148, 150
See application file for complete search history.

(56) References Cited

U.S. PATENT DOCUMENTS

| | | | | | |
|---|---|---|---|---|---|
| 1,769,074 | A | * | 7/1930 | Ruatti | E02F 3/08 |
| | | | | | 180/15 |
| 2,328,804 | A | * | 9/1943 | Hollmann | B62D 11/08 |
| | | | | | 192/12 R |
| 2,373,080 | A | * | 4/1945 | Norton | A01B 33/103 |
| | | | | | 172/119 |
| 2,762,226 | A | * | 9/1956 | Lang | A01B 71/06 |
| | | | | | 414/356 |
| 2,953,885 | A | | 9/1960 | Richey et al. | |
| 3,137,350 | A | * | 6/1964 | Horr | A01B 33/021 |
| | | | | | 172/117 |
| 3,226,853 | A | * | 1/1966 | Kamlukin | A01B 71/06 |
| | | | | | 172/79 |
| 4,191,259 | A | * | 3/1980 | Boren | A01B 33/103 |
| | | | | | 172/27 |
| 4,260,027 | A | * | 4/1981 | Langan | A01B 33/025 |
| | | | | | 172/121 |
| 4,545,438 | A | * | 10/1985 | Giovanni | A01B 33/103 |
| | | | | | 172/123 |
| 4,778,012 | A | * | 10/1988 | Kobashi | A01D 34/535 |
| | | | | | 172/123 |
| 5,346,018 | A | * | 9/1994 | Koster | A01B 59/00 |
| | | | | | 172/125 |
| 5,361,566 | A | * | 11/1994 | Hohnl | A01D 34/6806 |
| | | | | | 56/11.6 |
| 5,664,347 | A | * | 9/1997 | Chapman, Sr. | E02F 3/145 |
| | | | | | 180/14.4 |
| 2014/0166320 | A1 | * | 6/2014 | Olsen | A01B 33/02 |
| | | | | | 172/60 |

FOREIGN PATENT DOCUMENTS

| | | |
|---|---|---|
| DE | 10 2007 019 661 A1 | 11/2008 |
| GB | 1 489 162 A | 10/1977 |
| GB | 2 052 944 A | 2/1981 |
| WO | 2011/098479 A1 | 8/2011 |

OTHER PUBLICATIONS

International Search Report of the International Searching Authority mailed Mar. 5, 2013 for the corresponding international application No. PCT/EP2012/004434.

Written Opinion of the International Searching Authority mailed Mar. 5, 2013 for the corresponding international application No. PCT/EP2012/004434.

Office Action dated Aug. 11, 2016 issued in corresponding RU patent application No. 2014115286/13(023870) (and English translation).

\* cited by examiner

FORCE-TRANSMITTING UNIT

CROSS REFERENCE TO RELATED APPLICATIONS

This application is a U.S. national stage application of International Patent Application No. PCT/EP2012/004434 filed on Oct. 24, 2012, and claims priority to, and incorporates by reference, German Patent Application No. 10 2011 117 770.5 filed on Nov. 7, 2011.

PRIOR ART

The invention relates to a vehicle device comprising: a drive unit; a gear unit comprising an output shaft to drive an application tool, wherein the application tool can be orientated relative to the gear unit; at least one pivot unit which is provided to pivot the application tool relative to the gear unit about a pivot axis; and a force-transmitting unit between the gear unit and the application tool, wherein the gear unit is at least substantially securely connected to the drive unit, the force-transmitting unit comprises at least one first drive wheel, the first drive wheel is connected to the output shaft in an at least substantially rotationally secure manner in at least one operating state, the output shaft comprises a rotation axis, the rotation axis is orientated at least substantially perpendicularly relative to a forward direction and the pivot unit comprises at least one force unit to apply a force for pivoting the application tool to adjust a position of the application tool relative to the gear unit.

There is known from the prior art an application tool, for example, a mulcher, which can be fitted to a carrier machine, in particular a tractor, and which is supplied with mechanical energy in at least one operating state via a power take-off shaft by a gear unit of the carrier machine. The gear unit is securely connected to a drive unit of the carrier machine, in particular a diesel engine. The application tool can be adjusted in terms of height with respect to the carrier machine and consequently also in particular relative to the gear unit.

An objective of the invention is in particular to provide a generic vehicle device having an advantageously long service-life. The objective is achieved according to the invention by the features of the pivot unit comprising at least one force unit to apply a force for pivoting the application tool to adjust a position of the application tool relative to the gear unit, whilst advantageous embodiments and developments of the invention can be taken from the dependent claims.

ADVANTAGES OF THE INVENTION

The invention is based on a vehicle device having a drive unit, a gear unit which is at least substantially securely connected to the drive unit, and which comprises an output shaft to drive an application tool which can be orientated relative to the gear unit, and a force-transmitting unit between the gear unit and the application tool.

It is proposed that the force-transmitting unit have at least one first drive wheel which is connected to the output shaft in an at least substantially rotationally secure manner in at least one operating state and which has a rotation axis which is orientated at least substantially perpendicularly relative to a forward direction. The term a "vehicle device" is intended in particular to refer to a portion of a vehicle. The vehicle is in particular a vehicle for processing earth and/or snow and/or for grinding biomass and/or harvesting biomass, preferably a wood milling vehicle, a rotovating vehicle, a snow blowing vehicle and/or a minesweeping vehicle. In a particularly advantageous manner, the vehicle is constructed as a mulching vehicle. The term a "drive unit" is intended in particular to refer to a unit which is provided to convert chemical energy and/or electrical energy and/or thermal energy into kinetic energy, in particular rotation energy. The term "provided" in this instance and below is intended in particular to be understood to mean specially configured and/or equipped. The term "chemical energy" is intend to be understood in particular to be an energy which is contained in a chemical bond of atoms and/or molecules and which in particular becomes free during an exothermic reaction. Preferably, the drive unit is constructed as a diesel engine. Preferably, the drive unit is provided to supply at least one unit, in particular the application tool, with kinetic energy by means of at least one drive shaft. The fact that a first unit and a second unit are "at least substantially securely" connected is in particular intended to be understood to mean that in at least one assembled state, in particular with the exception of vibrations during an operating state of the vehicle device and a play, a spacing of the two units with respect to each other and an angular orientation of the units with respect to each other remain constant. Preferably, a maximum relative change of the spacing of the two units with respect to each other in at least one assembled state is always a maximum of 10%, in particular a maximum of 5%, preferably a maximum of 1% and, in a particularly advantageous manner, a maximum of 0.1%. Preferably, a maximum change of an angle between any surface normal of the first unit and any surface normal of the second unit in at least one assembled state is always a maximum of 20°, in particular a maximum of 10°, preferably a maximum of 5° and in a particularly advantageous manner a maximum of 1°.

Preferably, the gear unit is constructed as a mechanical gear unit and in a particularly advantageous manner as a positive-locking gear unit. Preferably, the gear unit is constructed as a distributor gear unit. The term a "distributor gear unit" is intended in this context to be understood in particular to be a gear unit which transmits an input torque which is supplied by the drive shaft from the drive unit to at least one output shaft which is arranged in an angular manner with respect to the drive shaft. The term arranged in an "angular" manner is intended in particular to be understood to be arranged at an angle greater than 0° and less than 180°. The term an "output shaft" of the gear unit is intended in particular to be understood to refer to a shaft which is provided for a transmission of mechanical energy to the application tool. Preferably, the drive shaft for the drive unit and the output shaft are arranged at least substantially perpendicularly relative to each other. The term an "application tool" is intended in particular to be understood to refer to a unit which is driven via the gear unit by the drive unit and which is provided for earth processing and/or vegetation processing, in particular for milling and/or grinding and/or scarifying and/or clearing. In particular, the application tool comprises a rotary member, on which tool elements, in particular cutting elements or chains, are arranged. The application tool may be any application tool which appears to be advantageous to the person skilled in the art, but preferably a mulcher, a rotovator, a wood mill, a wood chopper, a snow blower and/or a minesweeper. The fact that the application tool "can be orientated relative to the gear unit" is intended in particular to be understood to mean that a spacing between the application tool and the gear unit and/or an angular orientation of the application tool relative to the gear unit can be changed. Preferably, the application tool can be pivoted relative to the gear unit. The term a "force-transmitting unit" is in particular intended to be understood to be a unit which is provided to transmit a force from the gear unit to the application tool.

The fact that a first unit and a second unit are connected "in at least one operating state in an at least substantially rotationally secure manner" is intended to be understood in particular to mean that both units in the operating state, in particular with the exception of vibrations during the operating state and/or a play, in particular a coupling play, have angular speeds which are identical in value and preferably also in terms of vector. Preferably, in the operating state, an angular orientation of the units remains at least substantially constant with respect to each other. Preferably, in the operating state a maximum change of an angle between any surface normal of the first unit and any surface normal of the second unit is always a maximum of 20°, in particular a maximum of 10°, preferably a maximum of 5° and in a particularly advantageous manner a maximum of 1°. In particular, the operating state is an operating state which is different from a coupling operation. In particular, there may be provided between the output shaft and the first drive wheel a coupling unit, in particular an overload coupling and preferably a turbo coupling. In a particularly advantageous manner, however, the output shaft is at least substantially securely connected to the first drive wheel. The term a "drive wheel" is intended in this context to be understood to refer in particular to a wheel which is provided for driving at least one unit, in particular for driving the application tool and which preferably has on an outer radial edge at least one positive-locking element, for example, a tooth and/or a guiding groove. The drive wheel may in particular be constructed as a toothed wheel. The term a "forward direction" in this context is intended in particular to be understood to refer to a direction which, in at least one assembled state of the vehicle device on and/or in the vehicle, corresponds to a forward direction of the vehicle. Preferably, the forward direction faces from a center of gravity of the gear unit in the direction of the application tool. Preferably, a main extent plane of the first drive wheel is at least substantially parallel with a plane which is defined by the forward direction and a normal vector of a positional plane of the vehicle. The term "at least substantially parallel" with a reference direction is intended in particular to be understood to be at an angle of a maximum of 5°, preferably a maximum of 3° and in a particularly advantageous manner a maximum of 1° with respect to the reference direction. The term "at least substantially perpendicular" to a reference direction is intended in particular to be understood to be at an angle which deviates from a right angle by a maximum of 10°, in particular by a maximum of 5°, preferably by a maximum of 2° and in a particularly advantageous manner by a maximum of 1° with respect to the reference direction. The term a "rotation axis" is intended in this instance and below in particular to be understood to refer to a straight line about which in particular a revolution and/or rotation and/or pivoting of a unit is carried out in at least one operating state.

As a result of such an embodiment, it is possible to dispense with a drive shaft between a carrier machine and the application tool having a cardan joint which is susceptible to wear and which is maintenance-intensive. An advantageously long service-life and accordingly lower costs involving spatial requirement and time can thereby be achieved. Furthermore, this construction enables a larger structural height in a region between the application tool and the carrier machine so that a risk of material, in particular from branches, entering the region of the force-transmitting unit can be reduced to a minimum. Furthermore, all the force-carrying components of the force-transmitting unit can be accommodated within a protective housing unit. Finally, a spacing of the application tool with respect to the carrier machine can advantageously be reduced, whereby a compact structure can be achieved. In particular an overall length of the vehicle can be shortened and an overall center of gravity of the vehicle can be displaced into the center region thereof. A risk of the vehicle sinking in the case of soft ground can thereby be minimized. Furthermore, an advantageously large pivot region of the application tool relative to the carrier machine can be enabled.

In a preferred embodiment of the invention, it is proposed that the force-transmitting unit comprise at least one pull means drive unit and that at least a second drive wheel of the force-transmitting unit be driven by the first drive wheel in at least one operating state. The term "pull means drive unit" is intended in particular to be understood to be a gear unit in which a torque is transmitted between two shafts using a pull means which surrounds both shafts. The pull means drive unit is preferably constructed as a non-positive-locking pull means drive unit. It is thereby possible to provide a preferably low-maintenance force-transmitting unit. It is in particular possible to provide a reliable force flow from the gear unit to the application tool which can be orientated relative to the gear unit and which can in particular be adjusted in terms of height, the use of a cardan joint being able to be dispensed with. Furthermore, it is possible to provide a force-transmitting unit, which can advantageously be protected against infiltration of material which is crushed and/or which is intended to be crushed, in particular branches. The service-life of the vehicle can thereby advantageously be increased. The force-transmitting unit preferably comprises at least two pull means drive units which are in particular connected in parallel, whereby a force transmission can be optimized. In particular, a maximum force which occurs in the pull means can be reduced, whereby in particular the service-life of the pull means can advantageously be increased.

In a particularly preferred embodiment of the invention, it is proposed that the pull means drive unit be constructed as a belt drive unit and the first drive wheel be constructed as a first pulley and the second drive wheel be constructed as a second pulley. The term "belt drive unit" in this context is intended in particular to be understood to refer to a pull means drive unit in which the pull means is constructed in particular as a closed belt. Preferably, the pull means drive unit which is constructed as a belt drive unit has a so-called open belt guide, in which an intersection and/or an at least partial rotation of the belt are prevented. The term a "pulley" in this context is intended in particular to be understood to be a drive wheel which is provided at the radial edge to provide non-positive-locking transport of a belt. The pulley preferably comprises at least one holding element at the radial edge for positive-locking holding of the belt in a direction parallel with the rotation axis of the pulley. Furthermore, the pulley may have on the radial edge at least one guiding groove which is directed in a peripheral direction and in which in particular a guiding bead which is formed on the belt and which is orientated along the belt engages in a positive-locking manner. It is thereby possible to provide a cost-effective, reliable and low-maintenance pull means drive unit. Preferably, the vehicle device comprises at least one housing unit which at least partially surrounds the force-transmitting unit and in particular the pull means drive unit in at least one assembled state. It is thereby possible to provide in a particularly advantageous manner effective protection for the force-transmitting unit and in particular the pull means of the pull means drive unit. In particular, contamination of the pull means drive unit and accordingly an increase of the wear can be prevented.

Advantageously, the force-transmitting unit has a holding unit which holds the first drive wheel and the second drive wheel at least substantially with fixed spacing relative to each other. Preferably, the holding unit comprises a clamping unit which presses the first drive wheel and the second drive wheel apart, in particular as a result of a resilient force, and in particular in each case presses them against the pull means, in particular the belt. The fact that the holding unit holds the first and the second drive wheel "at least substantially" with fixed spacing relative to each other is in particular intended to be understood to mean that a maximum relative change of the spacing is a maximum of 10%, in particular a maximum of 5%, preferably a maximum of 1% and in a particularly advantageous manner a maximum of 0.5%. The reliability of the force-transmitting unit can thereby advantageously be increased. In particular a degree of resilience of the system in the event of impact loads can be achieved.

In another embodiment of the invention, it is proposed that the second drive wheel in at least one operating state be connected in an at least substantially rotationally secure manner to at least one drive wheel of at least one pull means drive unit of the application tool. Preferably, the second drive wheel and the drive wheel of the pull means drive unit of the application tool are connected to each other by means of a shaft, in a particularly advantageous manner by means of an articulated shaft which compensates for a shaft offset. Preferably, the pull means drive unit of the application tool is constructed as a belt unit and the drive wheel of the pull means drive unit of the application tool is constructed as a pulley. A simple construction can thereby be achieved.

It is further proposed that the vehicle device comprise at least one bearing unit which is provided to support the force-transmitting unit at least partially on the application tool. In particular, the bearing unit is provided to support the second drive wheel of the force-transmitting unit on the application tool. Advantageously, the bearing unit engages on the housing unit and/or on the holding unit of the force-transmitting unit. Reliability of the force-transmitting unit can thereby be further improved.

In another embodiment of the invention, it is proposed that the vehicle device comprise at least one pivot unit which is provided to pivot the application tool relative to the gear unit about a pivot axis. The term "pivot axis" is intended in particular to be understood to refer to a rotation axis, about which the application tool is pivoted relative to the gear unit during a pivot operation, a spacing of the application tool relative to the gear unit in particular being able to be variable during the pivot operation. Preferably, the pivot unit comprises a rotary bearing, by means of which the pivot axis is defined. Preferably, the pivot unit additionally comprises at least one force unit, in particular a hydraulic cylinder unit, to apply a force to pivot the application tool. Height adjustment of the application tool can advantageously thereby be enabled, in particular with a rigid connection being able to be achieved at the same time between the drive unit and the gear unit.

If a rotation axis of the output shaft and the pivot axis of the pivot unit are at least substantially spaced apart, advantageous lever relationships for the pivot unit can be enabled. The fact that the rotation axis and the pivot axis are "at least substantially spaced apart" is intended to be understood in particular to mean that a minimum spacing of the rotation axis relative to the pivot axis in at least one assembled state corresponds to at least 10%, in particular at least 25%, preferably at least 50% and in a particularly advantageous manner at least 100% of a diameter of the output shaft.

DRAWINGS

Other advantages will be appreciated from the following description of the drawings. An embodiment of the invention is illustrated in the drawings. The description and the claims contain numerous features in combination. A person skilled in the art will advantageously also consider the features individually and combine them to form other advantageous combinations.

Figure 1B:
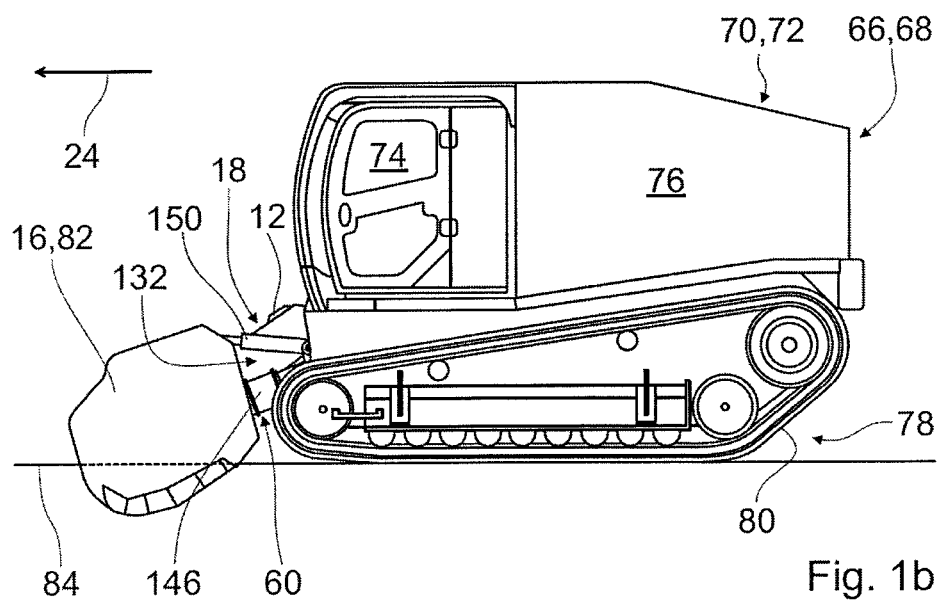
Figure 2:
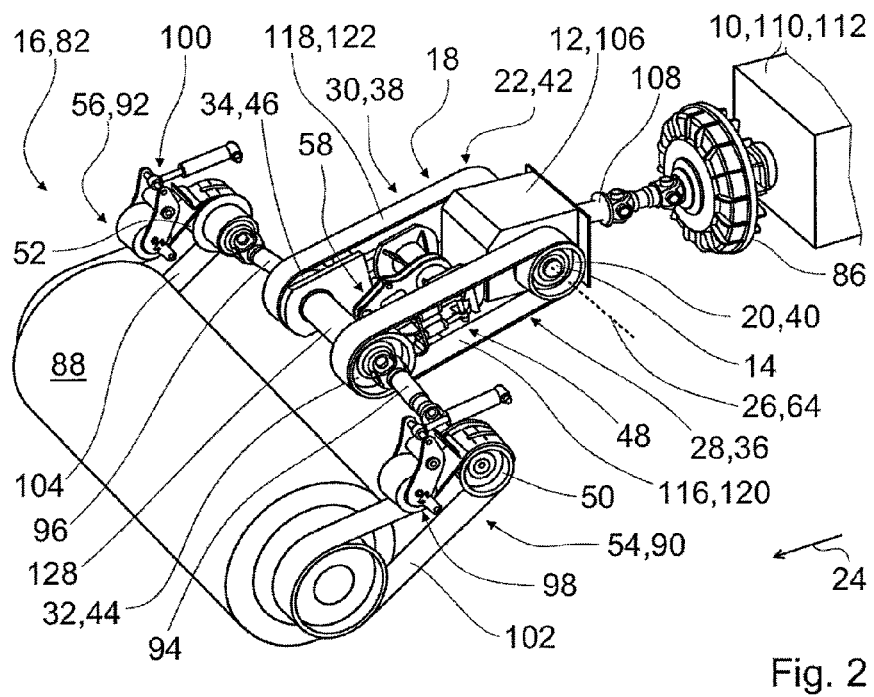
Figure 3:
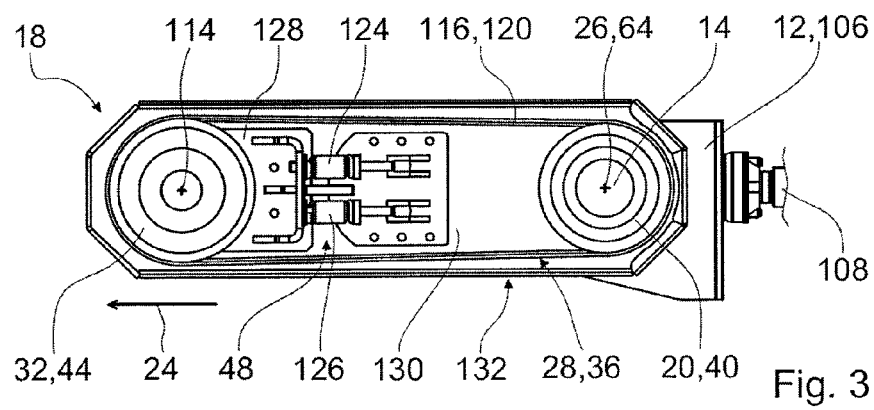
Figure 4A:
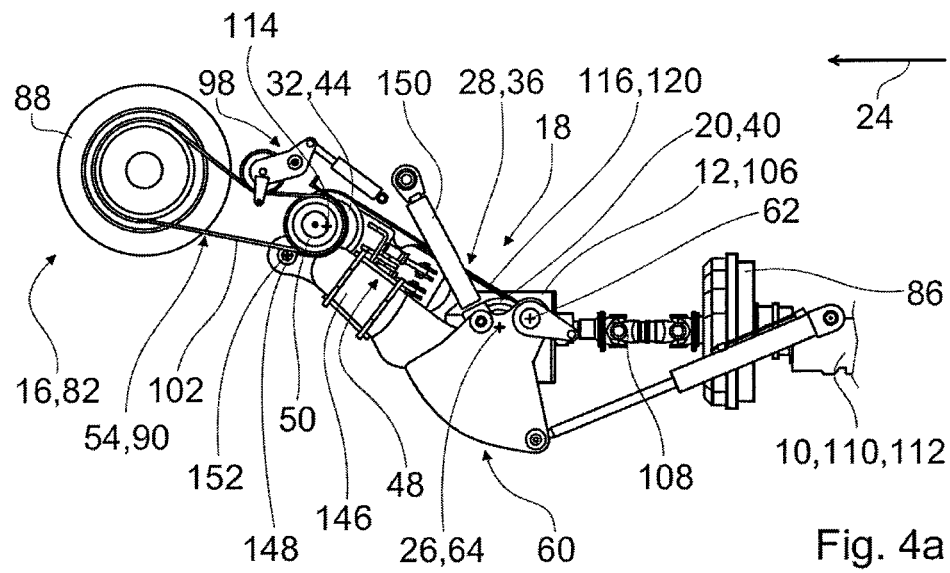
Figure 4B:
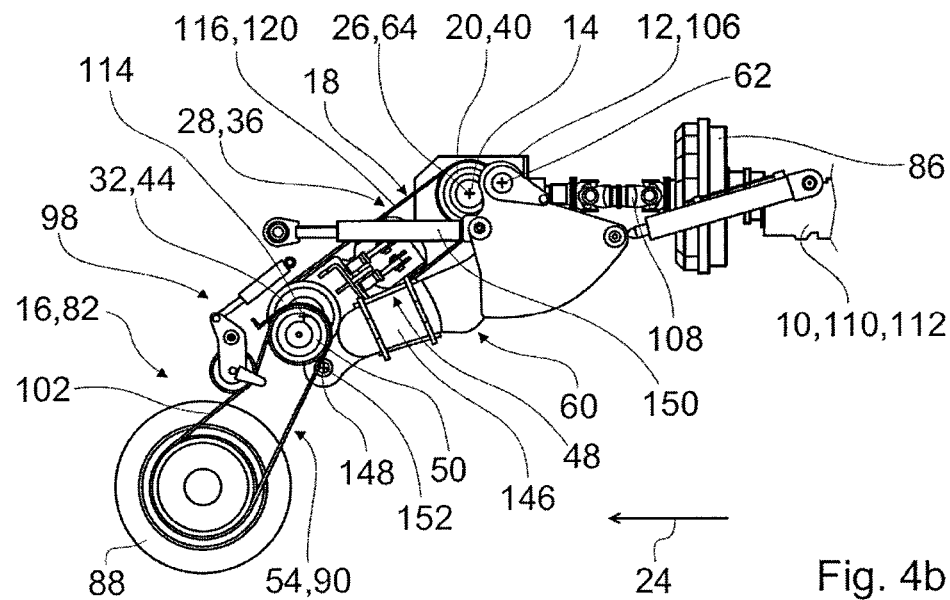
Figure 5:
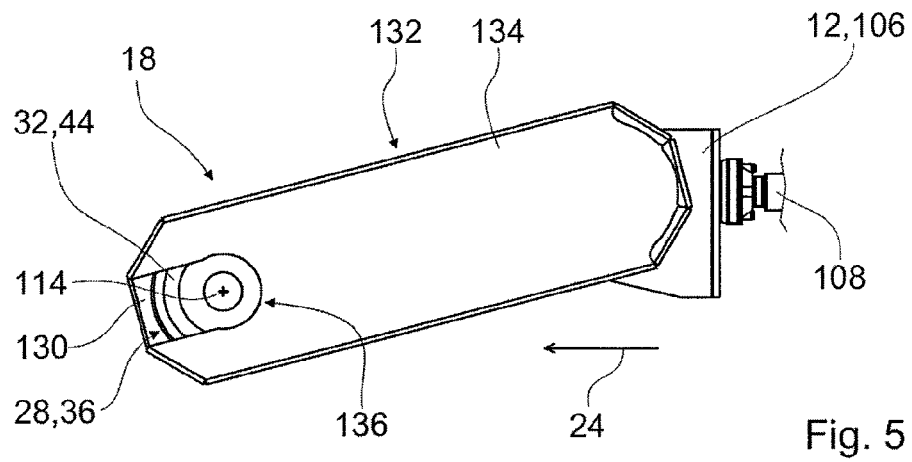
Figure 6:
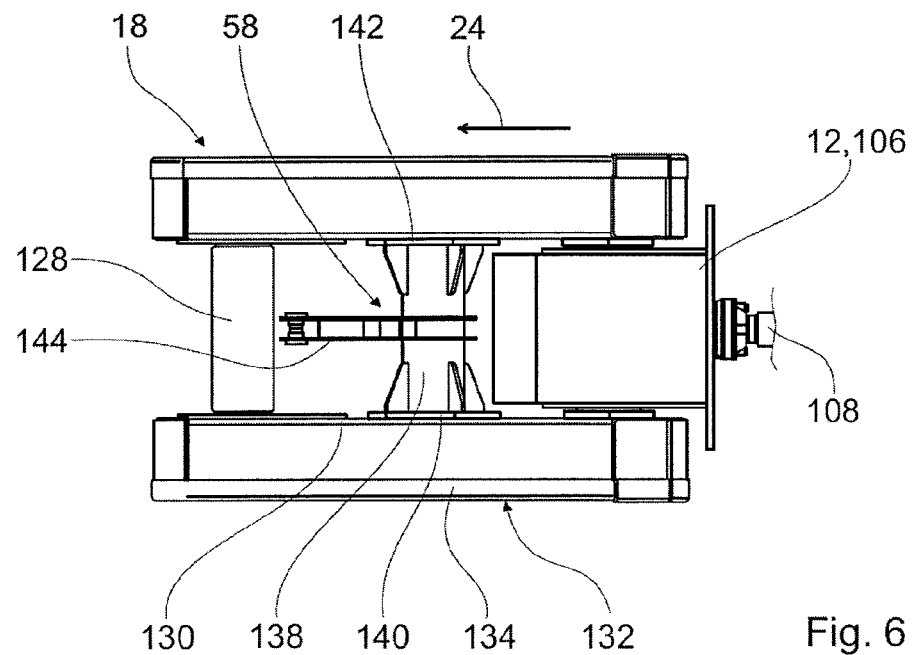

In the drawings:

FIG. 1a is a side view of a vehicle having a vehicle device according to the invention with an application tool in a transport position, FIG. 1b is a side view of the vehicle with the vehicle device with the application tool in an operating position, FIG. 2 is an isometric overview of a portion of the vehicle device having a drive unit, a gear unit, a force-transmitting unit and the application tool, FIG. 3 is a detailed side view of a portion of the force-transmitting unit, FIG. 4a is a side view of a portion of the vehicle device with the application tool in the transport position, FIG. 4b is a side view of the portion of the vehicle device from FIG. 4a with the application tool in the operating position, FIG. 5 is a side view of a portion of the force-transmitting unit with a housing unit and FIG. 6 is a plan view from above of the portion of the force-transmitting unit from FIG. 5.

DESCRIPTION OF THE EMBODIMENT

FIGS. 1a and 1b are side views of a vehicle 66 which is constructed as a mulching vehicle 68. The vehicle 66 comprises a carrier machine 70 and an application tool 16 which can be adjusted in terms of height relative to the carrier machine 70. The carrier machine 70 is constructed as a caterpillar tractor 72. The carrier machine 70 comprises a driver's cab 74, an engine room 76 and an undercarriage 78. The vehicle 66 can be controlled by a driver from the driver's cab 74. A drive unit 10 and other machine units not illustrated in the Figures, such as, for example, a hydraulic unit, are accommodated in the engine room 76. The undercarriage 78 comprises caterpillar tracks 80 which improve propulsion of the vehicle 66, in particular including over difficult terrain. The caterpillar tracks 80 are driven by means of a hydraulic motor, which is supplied by the hydraulic unit which is driven by the drive unit 10 with a pressurized fluid (not illustrated). The application tool 16 is constructed as a mulcher 82. FIG. 1a shows the application tool 16 in a maximum transport position with maximum height of the application tool 16 over a positional plane 84 of the undercarriage 78. In the maximum transport position, the application tool 16 is located 1300 mm above the positional plane 84. FIG. 1b shows the application tool 16 in a minimum operating position with minimum height of the application tool 16. In the operating position, a lower edge of the application tool 16 is located 450 mm below the positional plane 84. The vehicle 66 comprises a vehicle device according to the invention.

FIG. 2 is an isometric overview of a portion of the vehicle device. The vehicle device comprises the drive unit 10 schematically illustrated in FIG. 2, the application tool 16, of which only a portion is illustrated in FIG. 2, a gear unit 12 and a turbo coupling 86. The application tool 16 comprises a cutting rotor 88 which is known from the relevant prior art and which is illustrated in FIG. 2 in a simplified manner as a horizontal cylinder. Such a cutting rotor 88 is known, for example, from DE 43 27 120 C1. In an operating state, the cutting rotor 88 rotates about the longitudinal axis thereof, biomass, such as, for example, branches, being ground by means of cutting tools which are arranged on a cylindrical-cover-like surface of the cutting rotor 88. The application tool 16 further comprises at both sides of the cutting rotor 88 a pull means drive unit 54, 56 to drive the cutting rotor 88, respectively. The pull means drive units 54, 56 are constructed as belt drive units 90, 92. The cutting rotor 88 is driven by two application tool drive shafts 94, 96 via the pull means drive units 54, 56. Each pull means drive unit 54, 56 comprises a pull means tightening unit 98, 100 which is provided in known manner for tightening a pull means 102, 104 of the respective pull means drive unit 54, 56. The gear unit 12 is constructed as an angular distributor gear unit 106 which has an input shaft 108 and two output shafts 14, of which only one can be seen in FIG. 2. The output shafts 14 are arranged in a linear extension with respect to each other and perpendicularly relative to the input shaft 108. The output shafts 14 are arranged in a plane parallel with the positional plane 84. The output shafts 14 are provided to drive the cutting rotor 88 of the application tool 16. The input shaft 108 is orientated parallel with a forward direction 24 of the vehicle 66 in an assembled state. The input shaft 108 is driven in an operating state by the drive unit 10 via the turbo coupling 86. The gear unit 12 is securely connected to the drive unit 10. The drive unit 10 is constructed as an internal combustion engine 110. The internal combustion engine 110 is a diesel engine 112. The turbo coupling 86 constitutes an overload protection means and is in particular provided to prevent stalling of the internal combustion engine 110 in the event of impeded running and/or blockage of the cutting rotor 88.

The vehicle device further comprises a force-transmitting unit 18 between the gear unit 12 and the application tool 16. The force-transmitting unit 18 is in particular provided for a transmission of force from the gear unit 12 to the application tool 16, even when the application tool 16 is moved by means of a pivot unit 60 of the vehicle device relative to the gear unit 12 (not illustrated in FIG. 2, cf. instead FIGS. 1a, 1b, 4a and 4b). The force-transmitting unit 18 comprises two first drive wheels 20, 22 which are each securely connected to one of the output shafts 14. The first drive wheels 20, 22 have a common rotation axis 26 which is orientated perpendicularly relative to the forward direction 24. The first drive wheels 20, 22 are first pulleys 40, 42 of two pull means drive units 28, 30 of the force-transmitting unit 18, which drive units are constructed as belt drive units 36, 38. The pull means drive units 28, 30 each have a second drive wheel 32, 34 which are constructed as second pulleys 44, 46. The second drive wheels 32, 34 have a common rotation axis 114, which is arranged parallel with the rotation axis 26 of the first drive wheels 20, 22 (cf. FIG. 3). Pull means 116, 118 of the pull means drive units 28, 30 are tensioned between the first drive wheels 20, 22 and the second drive wheels 32, 34. The pull means 116, 118 are constructed as belts 120, 122. The belts 120, 122 may be any belts 120, 122 which appear to be advantageous to a person skilled in the art, in particular flat belts, preferably V-belts but in a particularly advantageous manner V-ribbed belts. The second drive wheels 32, 34 of the pull means drive units 28, 30 are connected in a rotationally secure manner by means of the application tool drive shafts 94, 96 to drive wheels 50, 52 of the pull means drive units 54, 56 of the application tool 16. The drive wheels 50, 52 finally drive the cutting rotor 88 by means of the pull means 102, 104.

FIG. 3 is a detailed side view of a portion of the force-transmitting unit 18. The force-transmitting unit 18 comprises a holding unit 48 which is provided to hold the first drive wheels 20, 22 and the second drive wheels 32, 34 of the respective pull means drive unit 28, 30 with fixed spacing from each other. The holding unit 48 comprises for each pull means drive unit 28, 30 two belt tightening units 124, 126, respectively, of which only two can be seen in FIG. 3. The belt tightening units 124, 126 engage at one side on a bearing element 128 of the second drive wheels 32, 34 (cf. also FIG. 2) and at the other side on a portion 130 of a housing unit 132 of the vehicle device. The housing unit 132 is provided to cover the pull means drive units 28, 30 (cf. also FIGS. 5 and 6). In FIG. 3, a covering element 134 of the housing unit 132 is removed so that the pull means drive unit 28 can be seen. The bearing element 128 of the second drive wheels 32, 34 is movably arranged with respect to the portion 130 of the housing unit 132. As a result of the belt tightening units 124, 126, the first drive wheels 20, 22 and the second drive wheels 32, 34 are pressed apart by a resilient force, whereby the belts 120, 122 are tightened.

FIGS. 4a and 4b are side views of a portion of the vehicle device. FIG. 4a shows the portion of the vehicle device in the maximum transport position from FIG. 1a. FIG. 4b shows the portion of the vehicle device in the minimum operating position according to FIG. 1b. The pivot unit 60 is provided to pivot the application tool 16 relative to the gear unit 12 about a pivot axis 62. The pivot axis 62 is arranged parallel with a common rotation axis 64 of the output shafts 14. The rotation axis 64 corresponds in this instance to the rotation axis 26 of the first drive wheels 20, 22 of the pull means drive units 28, 30. The rotation axis 64 of the output shafts 14 and the pivot axis 62 of the pivot unit 60 are substantially spaced apart from each other, whereby advantageously favorable lever relationships for the pivot unit 60 can be achieved with a small spatial requirement. By using the force-transmitting unit 18 with the pull means drive units 28, 30, a height adjustment of the application tool 16 can be achieved within particularly wide limits, in particular compared with a force-transmitting unit having a cardan shaft for force transmission. The pivot unit 60 comprises two pivot arms 146 which are arranged parallel with each other and of which only one can be seen in FIGS. 4a and 4b. The pivot arms 146 are operated hydraulically in known manner. The pivot arms 146 are secured to a lower region of the application tool 16 and are provided for receiving a large proportion of a mass of the application tool 16. To this end, the pivot arms 146 each have a bearing opening 148 in an end region. Furthermore, the pivot unit 60 comprises two hydraulic cylinder units 150 which are arranged parallel with each other and which are secured, on the one hand, to the pivot arms 146 and, on the other hand, to an upper region of the application tool 16 (cf. FIGS. 1a and 1b). The hydraulic cylinder units 150 act as upper links and enable additional pivoting of the application tool 16 about a pivot axis 152 defined by the bearing openings 148. Since the drive wheels 50, 52 of the pull means drive units 54, 56 are securely supported in the application tool 16 and the pivot axis 62 is spaced apart from the rotation axis 26 and the pivot axis 152 is spaced apart from the rotation axis 114, there is produced a shaft offset which is dependent on a pivot angle about the pivot axis 62 and a pivot angle about the pivot axis 152 between a shaft of the second drive wheels 32, 34 of the pull means drive units 28, 30 of the force-transmitting unit 18 and the drive wheels 50, 52 of the pull means drive units 54, 56 of the application tool 16. This shaft offset is compensated for in that the application tool drive shafts 94, 96 which connect the second drive wheels 32, 34 to the drive wheels 50, 52 each have two cardan joints (cf. FIG. 2).

FIG. 5 is a side view of a portion of the force-transmitting unit 18 with the closed housing unit 132. The housing unit 132 at least substantially surrounds the pull means drive units 28, 30 in an assembled state. The housing unit 132 is constructed in two parts and individually engages around the individual pull means drive units 28, 30 at least substantially in each case. The housing unit 132 has at both sides a recess 136 in the covering element 134 for the introduction of the application tool drive shafts 94, 96. Furthermore, the housing unit 132 has at both sides a recess for the bearing element 128 of the second drive wheels 32, 34 (not illustrated). The housing unit 132 protects the pull means drive units 28, 30 from contamination in an operating state of the vehicle 66. For maintenance of the pull means drive units 28, 30, the covering element 134 of the housing unit 132 can be removed.

FIG. 6 is a plan view from above of the portion of the force-transmitting unit 18 from FIG. 5. The vehicle device comprises a bearing unit 58 which is provided to at least partially support the force-transmitting unit 18 on the application tool 16. The bearing unit 58 has a transverse connection element 138 and two plate-like securing elements 140, 142 for securing on the portion 130 of the housing unit 132. Furthermore, the bearing unit 58 has a connection element 144 which is provided to be secured to a corresponding connection element of the application tool 16 (not illustrated) in an assembled state.

Alternatively or additionally, it is conceivable for a vehicle device to have a turbo coupling in each case between a second drive wheel of a pull means drive unit of a force-transmitting unit and a drive wheel of a pull means drive unit of an application tool. Securing of a drive unit with respect to impact loads can thereby be further improved.

Furthermore, belt tightening units of a holding unit of a force-transmitting unit may additionally have a belt loosening function so that, by pulling together the belt tightening units, a spacing between the first drive wheels and second drive wheels of the force-transmitting unit can be reduced. It is thereby advantageously possible to integrate a coupling function, in particular a manual coupling function, in the holding unit in a simple manner.

| Reference numerals | |
|---|---|
| 10 | Drive unit |
| 12 | Gear unit |
| 14 | Output shaft |
| 16 | Application tool |
| 18 | Force-transmitting unit |
| 20 | First drive wheel |
| 22 | First drive wheel |
| 24 | Forward direction |
| 26 | Rotation axis |
| 28 | Pull means drive unit |
| 30 | Pull means drive unit |
| 32 | Second drive wheel |
| 34 | Second drive wheel |
| 36 | Belt drive unit |
| 38 | Belt drive unit |
| 40 | First pulley |
| 42 | First pulley |
| 44 | Second pulley |
| 46 | Second pulley |
| 48 | Holding unit |
| 50 | Drive wheel |
| 52 | Drive wheel |
| 54 | Pull means drive unit |
| 56 | Pull means drive unit |
| 58 | Bearing unit |
| 60 | Pivot unit |
| 62 | Pivot axis |
| 64 | Rotation axis |
| 66 | Vehicle |
| 68 | Mulching vehicle |
| 70 | Carrier machine |
| 72 | Caterpillar tractor |
| 74 | Driver's cab |
| 76 | Engine room |
| 78 | Undercarriage |
| 80 | Caterpillar track |
| 82 | Mulcher |
| 84 | Positional plane |
| 86 | Turbo coupling |
| 88 | Cutting rotor |
| 90 | Belt drive unit |
| 92 | Belt drive unit |
| 94 | Application tool drive shaft |
| 96 | Application tool drive shaft |
| 98 | Pull means tightening unit |
| 100 | Pull means tightening unit |
| 102 | Pull means |
| 104 | Pull means |
| 106 | Angle distributor gear unit |
| 108 | Input shaft |
| 110 | Internal combustion engine |
| 112 | Diesel engine |
| 114 | Rotation axis |
| 116 | Pull means |
| 118 | Pull means |
| 120 | Belt |
| 122 | Belt |
| 124 | Belt tightening unit |
| 126 | Belt tightening unit |
| 128 | Bearing element |
| 130 | Portion |
| 132 | Housing unit |
| 134 | Covering element |
| 136 | Recess |
| 138 | Transverse connection element |
| 140 | Securing element |
| 142 | Securing element |
| 144 | Connection element |
| 146 | Pivot arm |
| 148 | Bearing opening |
| 150 | Hydraulic cylinder unit |
| 152 | Pivot axis |

The invention claimed is:

1. A vehicle device comprising:
a drive unit;
a gear unit comprising an output shaft to drive an application tool, wherein the application tool can be orientated relative to the gear unit;
at least one pivot unit which is provided to pivot the application tool relative to the gear unit about a pivot axis;
and a force-transmitting unit between the gear unit and the application tool, wherein the gear unit is at least substantially securely connected to the drive unit,
the force-transmitting unit comprises at least one first drive wheel, wherein the first drive wheel is connected to the output shaft in an at least substantially rotationally secure manner in at least one operating state, and the output shaft comprises a rotation axis, the rotation axis being orientated at least substantially perpendicularly relative to a forward direction of the vehicle, wherein the pivot unit comprises at least one force unit to apply a force for pivoting the application tool to adjust a position of the application tool relative to the gear unit, wherein the gear unit comprises an input shaft and the output shaft, wherein the output shaft is arranged perpendicularly relative to the input shaft, wherein the input shaft is driven in an operating state by the drive unit, wherein the force-transmitting unit comprises at least one pull means drive unit and at least one second drive wheel of the force-transmitting unit is driven by the first drive wheel via a pull means of the pull means drive unit in at least one operating state, wherein the second drive wheel, in at least one operating state, is connected in an at least substantially rotationally secure manner to at least one drive wheel of at least one pull means drive unit of the application tool, and wherein the second drive wheel is connected to the drive wheel of the application tool via an articulated application tool drive shaft, wherein the application tool drive shaft comprises two cardan joints.

2. The vehicle device according to claim 1, wherein the pull means drive unit of the force-transmitting unit is constructed as a belt drive unit and the first drive wheel is constructed as a first pulley and the second drive wheel is constructed as a second pulley.

3. The vehicle device according to claim 2, wherein the force-transmitting unit comprises a holding unit, wherein the holding unit holds the first drive wheel and the second drive wheel at least substantially with fixed spacing relative to each other.

4. The vehicle device according to claim 1, wherein the force-transmitting unit comprises a holding unit, wherein the holding unit holds the first drive wheel and the second drive wheel at least substantially with fixed spacing relative to each other.

5. The vehicle device according to claim 1, comprising at least one bearing unit which is provided to at least partially support the force-transmitting unit on the application tool.

6. The vehicle device according to claim 1, wherein the rotation axis of the output shaft and the pivot axis of the pivot unit are at least substantially spaced apart.

7. A force-transmitting unit of a vehicle device according to claim 1.

8. A vehicle comprising a vehicle device according to claim 1.

9. The vehicle device according to claim 1, wherein the application tool comprises a cutting rotor, wherein the application tool comprises at both sides of the cutting rotor a pull means drive unit to drive the cutting rotor.

10. The vehicle device according to claim 1, wherein the force-transmitting unit comprises a holding unit, wherein the holding unit is provided to hold the first drive wheel and the second drive wheel of the pull means drive unit of the force-transmitting unit with fixed spacing from each other, wherein the holding unit comprises two belt tightening units.

11. The vehicle device according to claim 1, wherein the pivot unit comprises two pivot arms which are arranged parallel with each other, wherein the pivot arms are operated hydraulically.

12. The vehicle unit according to claim 11, wherein the pivot unit comprises two hydraulic cylinder units for pivoting the application tool, wherein the hydraulic cylinder units are arranged in parallel, wherein the hydraulic cylinder units are secured to the pivot arms and to an upper region of the application tool.

13. The vehicle device according to claim 1, wherein the pull means drive unit of the force-transmitting unit is constructed as a belt drive unit, wherein the first drive wheel is constructed as a first pulley and the second drive wheel is constructed as a second pulley, wherein the at least one pull means drive unit of the application tool is constructed as a belt drive unit.

14. The vehicle device according to claim 1, wherein the force unit is a hydraulic cylinder unit.

15. The vehicle device according to claim 1, wherein a position of a rotation axis of the input shaft is fixed relative to a position of the rotation axis of the output shaft.

16. The vehicle device according to claim 15, wherein the rotation axis of the input shaft and the rotation axis of the output shaft span a plane, wherein the plane contains the rotation axis of the input shaft and the rotation axis of the output shaft.

17. The vehicle device according to claim 1, wherein the input shaft is driven by the drive unit via a turbo coupling.

18. A vehicle device comprising:
a drive unit;
a gear unit comprising an output shaft to drive an application tool, wherein the gear unit is at least substantially securely connected to the drive unit;
at least one pivot unit which is provided to pivot the application tool relative to the gear unit about a pivot axis, wherein the application tool can be orientated relative to the gear unit;
and a force-transmitting unit between the gear unit and the application tool, wherein the gear unit comprises an input shaft and the output shaft,
the output shaft comprises a rotation axis,
the rotation axis of the output shaft is orientated at least substantially perpendicularly relative to a forward direction of the vehicle,
the output shaft is arranged perpendicularly relative to the input shaft,
the input shaft is driven in an operating state by the drive unit via a turbo coupling,
the force-transmitting unit comprises at least one pull means drive unit,
the pull means drive unit comprises at least one first drive wheel and at least one second drive wheel,
the first drive wheel is connected to the output shaft in an at least substantially rotationally secure manner in at least one operating state,
the second drive wheel is driven by the first drive wheel via a pull means of the pull means drive unit in at least one operating state,
the second drive wheel, in at least one operating state, is connected in an at least substantially rotationally secure manner to at least one drive wheel of at least one pull means drive unit of the application tool via an articulated application tool drive shaft, wherein the application tool drive shaft comprises two cardan joints,
the pivot unit comprises at least one force unit to apply a force for pivoting the application tool to adjust a position of the application tool relative to the gear unit.

* * * * *